US008763893B2

(12) United States Patent
Backes et al.

(10) Patent No.: US 8,763,893 B2
(45) Date of Patent: Jul. 1, 2014

(54) SWITCHABLE RFID CARD READER ANTENNA

(75) Inventors: Glen Backes, Maple Grove, MN (US); Robert Charles Becker, Eden Prairie, MN (US); Alan Cornett, Andover, MN (US)

(73) Assignee: Honeywell International Inc., Morristown, NJ (US)

( * ) Notice: Subject to any disclaimer, the term of this patent is extended or adjusted under 35 U.S.C. 154(b) by 135 days.

(21) Appl. No.: 13/365,024

(22) Filed: Feb. 2, 2012

(65) Prior Publication Data

US 2013/0200151 A1 Aug. 8, 2013

(51) Int. Cl.
*G06F 17/00* (2006.01)

(52) U.S. Cl.
USPC .......................................... 235/375; 235/492

(58) Field of Classification Search
USPC .......................... 235/375, 492; 343/748, 876
See application file for complete search history.

(56) References Cited

U.S. PATENT DOCUMENTS

| | | | | |
|---|---|---|---|---|
| 4,812,822 | A * | 3/1989 | Feltz et al. | 340/572.4 |
| 4,872,018 | A * | 10/1989 | Feltz et al. | 343/742 |
| 7,176,691 | B2 * | 2/2007 | Nelson | 324/327 |

* cited by examiner

*Primary Examiner* — Daniel St Cyr
(74) *Attorney, Agent, or Firm* — Schwegman, Lundberg & Woessner, P.A.

(57) ABSTRACT

An antenna includes a plurality of loops and a plurality of double pole double throw (DPDT) switches. The plurality of DPDT switches is coupled to the plurality of loops. The DPDT switches are configured to cause a change in direction of current in one or more of the plurality of loops, thereby altering a direction of a magnetic field in one or more of the plurality of loops, such that a device positioned at a plurality of positions in relation to the antenna is electromagnetically coupled to the antenna at the plurality of positions.

18 Claims, 6 Drawing Sheets

SIDE VIEW

SWITCHABLE RFID CARD READER ANTENNA

GOVERNMENT INTEREST

This invention was made with Government support under Contract Number: **-*9825-***. The Government has certain rights in the invention.

TECHNICAL FIELD

The present disclosure relates to a switchable RFID card reader antenna, and in an embodiment, but not by way of limitation, a switchable RFID card reader antenna that includes a plurality of loops and a plurality of double pole double throw switches.

BACKGROUND

A contactless smartcard, when held in the vicinity of a reader and reader coil, completes a transformer circuit which allows a two way communication to take place between the card and the reader. This type of communication is based on RF (radio frequency) magnetic field lines emanating from the reader coil to the card coil. The card then modulates this field with data on a subcarrier for communication back to the reader. In order to properly function, sufficient magnetic field lines must pass through the open area of the loop coil of the card. An issue with current technology is that the maximum number of field lines only occurs when the card is held exactly parallel to the reader coil. If the card is held perpendicular to the reader coil, there will be no field lines passing through the card coil and no communication will occur. Similarly, if the card is held at an angle to the reader, there may be insufficient field lines passing through the card antenna and no communication will occur.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

An embodiment of the present disclosure is an electronically reconfigurable antenna that changes the direction of RF current through specified paths in the antenna. A particular embodiment is part of a card reader, and allows the card reader antenna to couple to a card when the card is held at any angle with respect to the card reader antenna. This is accomplished by reconfiguring the magnetic field lines of the card reader antenna to sequentially align with the spatial axes x, y, and z.

Figure 1A:
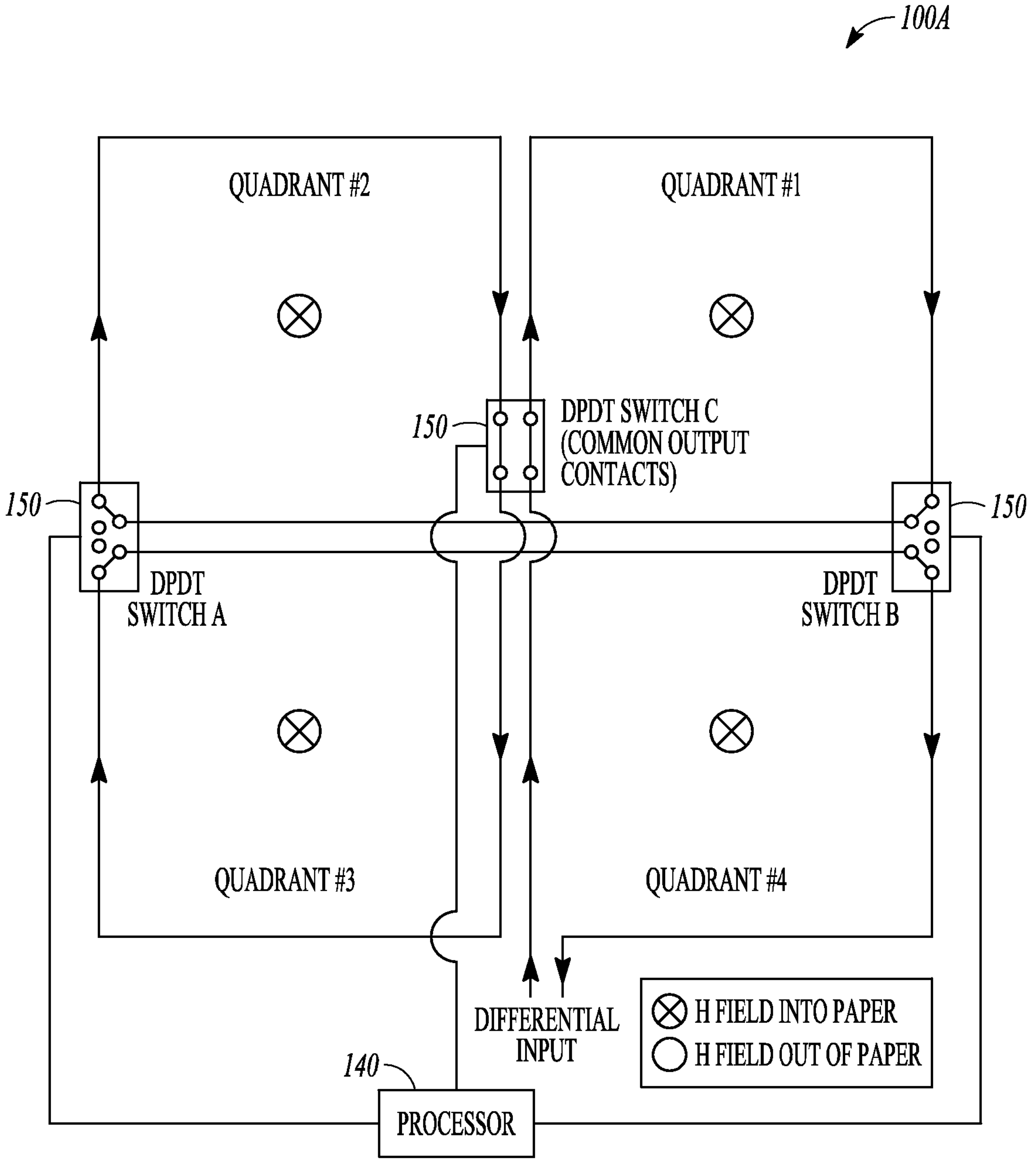
FIG. 1A illustrates a switchable RFID (radio frequency identification) card reader antenna including three DPDT (double pole double throw) switches in a first configuration.
Figure 1B:
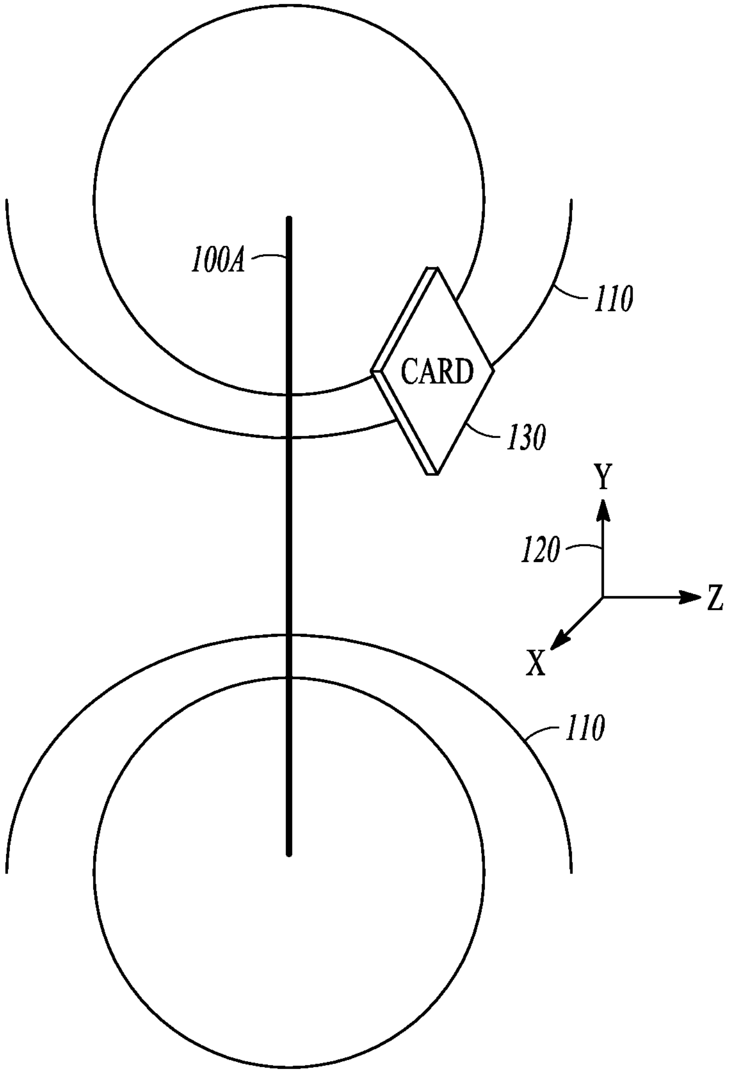
FIG. 1B illustrates a magnetic card and an orientation to the switchable antenna of FIG. 1A.
Figure 2A:
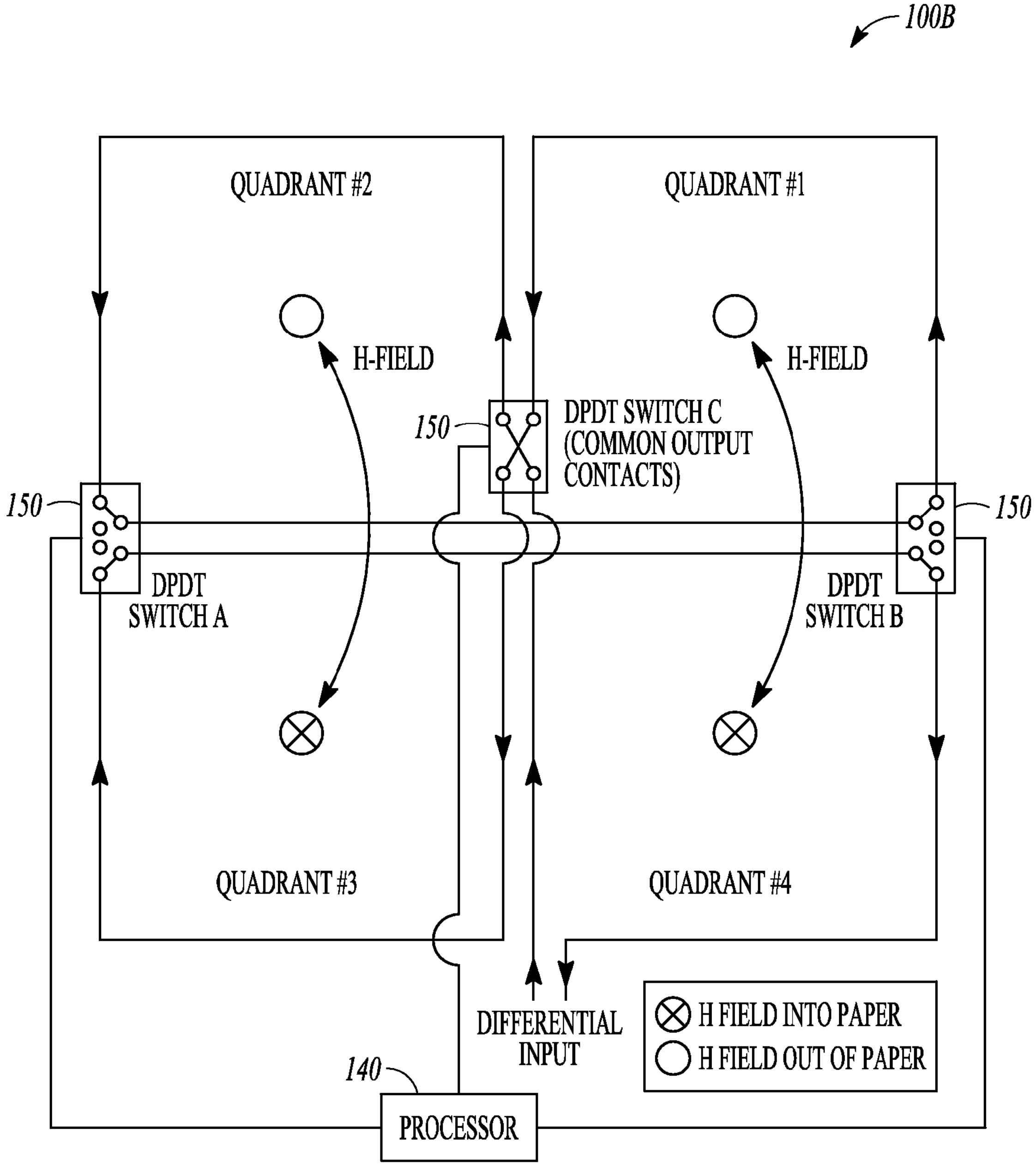
FIG. 2A illustrates a switchable RFID (radio frequency identification) card reader antenna including three DPDT (double pole double throw) switches in a second configuration.
Figure 2B:
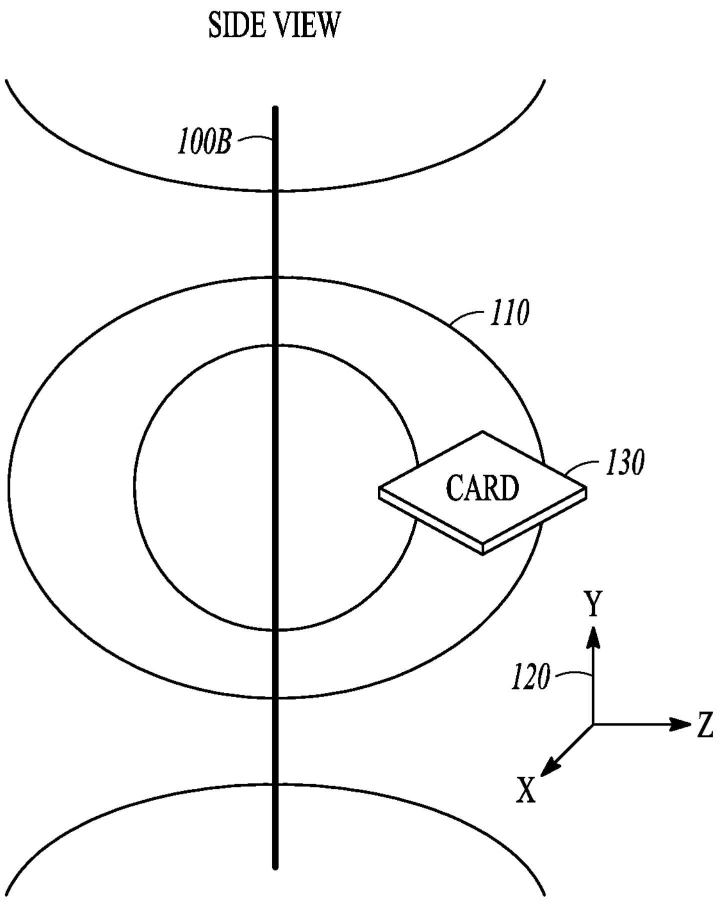
FIG. 2B illustrates a magnetic card and an orientation to the switchable antenna of FIG. 2A.
Figure 3A:
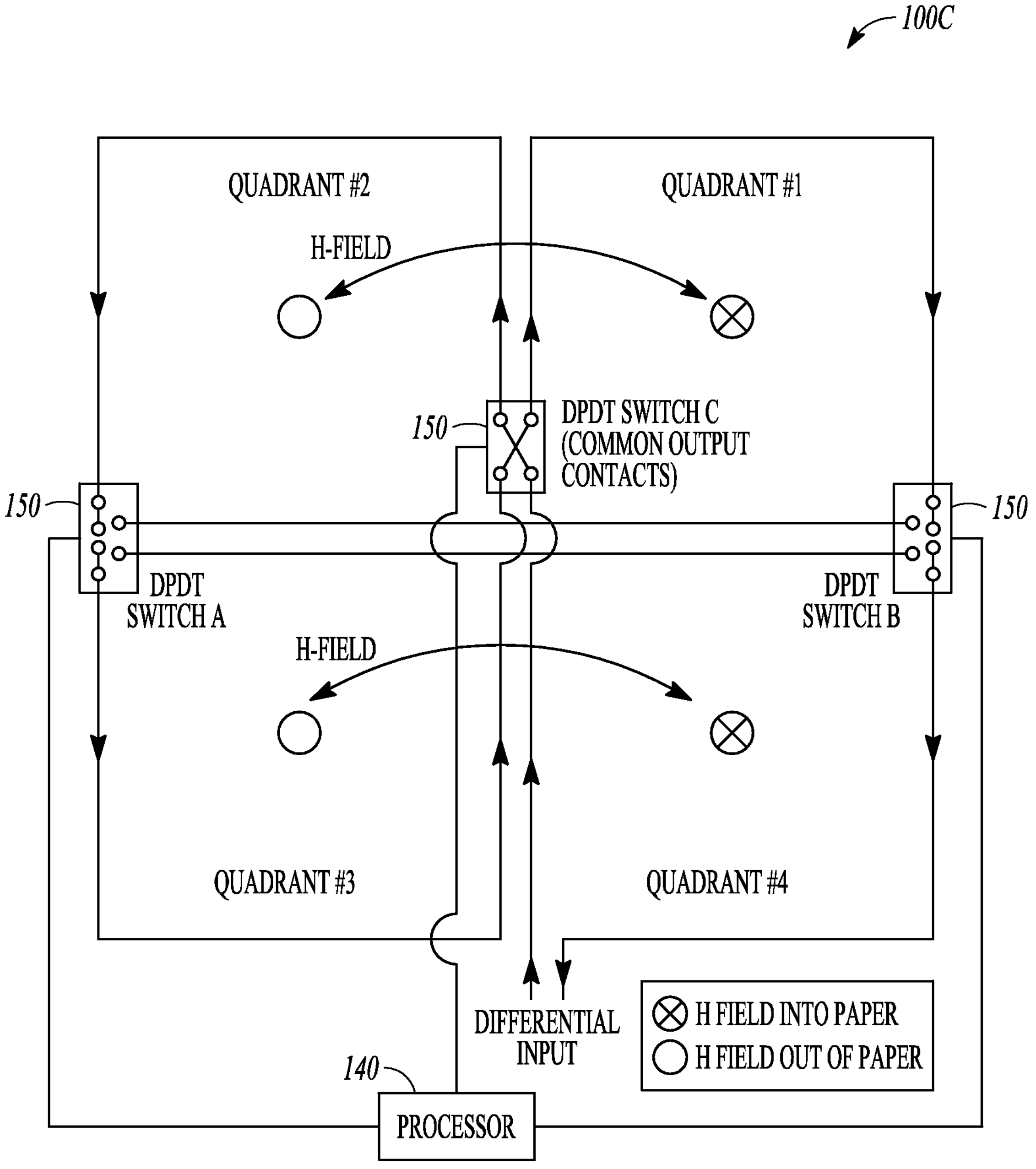
FIG. 3A illustrates a switchable RFID (radio frequency identification) card reader antenna including three DPDT (double pole double throw) switches in a third configuration.
Figure 3B:
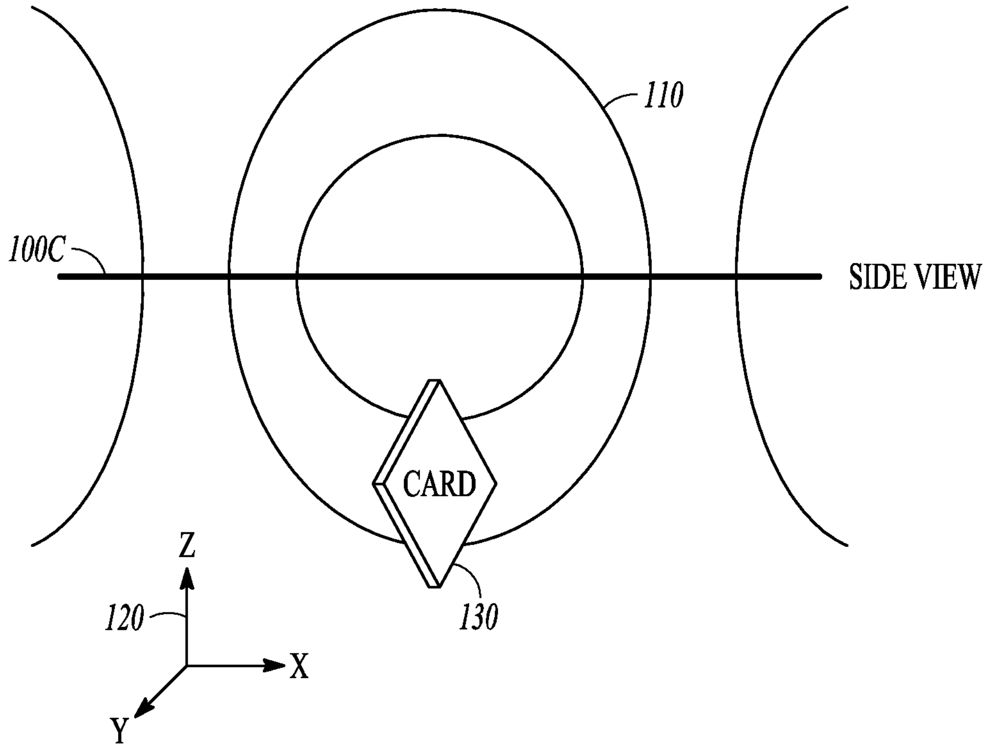
FIG. 3B illustrates a magnetic card and an orientation to the switchable antenna of FIG. 3A.

Each of FIGS. 1A, 1B, 2A, 2B, 3A, and 3B illustrate embodiments 100A, 100B, and 100C. Each figure refers to a state of the antenna that aligns with the x, y, and z axes 120 respectively. As illustrated in FIGS. 1B, 2B, and 3B, the H field lines 110 relate to the magnetic field strength (usually measured in units of A/m). In one embodiment, the card reader antennas 100A, 100B, and 100C contain four adjacent loops and three double pole double throw (DPDT) switches 150 to reconfigure the direction of the current in each of the four loops. The direction of the H field 110 in each loop is determined by the right hand thumb rule according to the electrical current direction.

In FIGS. 1A and 1B, the current is directed in a manner such that the H field in all four sections of the antenna is the same (all in the z axis). This allows a card 130 to be read when the card is held in the x-y plane as illustrated in FIG. 1B. In FIGS. 2A and 2B, the current is directed in a manner such that the H field 110 in the top two sections of the antenna is opposite that of the H field in the bottom two sections. This allows sufficient field strength in the y axis so that a card 130 can be read when the card is held in the x-z plane as illustrated in FIG. 2B. In FIGS. 3A and 3B, the current is directed in a manner such that the H field 110 in the left two sections of the antenna is opposite that of the H field in the right two sections. This allows sufficient field strength in the x axis so that a card 130 can be read when the card is held in the y-z plane as illustrated in FIG. 3B.

A controller or microprocessor 140 coupled to the card reader antenna will time multiplex the states of the three switches 150 such that the electrical RF current will flow to create an orientation of the H field 110 that will cycle through the three x, y, and z orientations. The frequency at which the field orientation is switched should be slow enough to complete an initialization cycle for a card in each of the three field axes. In most applications, a frequency of about 5 Hz would suffice. Upon receiving an acknowledge response from the card 130, the switching of the antenna 100 enters a static mode where no further switching of the magnetic field orientation occurs until the communication with the card is complete or communication with the card is lost.

Example Embodiments

Several embodiments and sub-embodiments have been disclosed above, and it is envisioned that any embodiment can be combined with any other embodiment or sub-embodiment. Specific examples of such combinations are illustrated in the examples below.

Example No. 1 is an antenna that includes a plurality of loops (quadrants 1, 2, 3, and 4 in FIGS. 1A, 2A, and 3A) and a plurality of double pole double throw (DPDT) switches (150). As illustrated in FIGS. 1A, 2A, and 3A, the plurality of DPDT switches is coupled to the plurality of loops. The DPDT switches are configured to cause a change in direction of current in one or more of the plurality of loops. This change in current direction, as illustrated in FIGS. 1A, 2A, and 3A, alters the direction of a magnetic field in one or more of the plurality of loops, and this permits a device that is positioned at a plurality of spatial and angular positions in relation to the antenna as is illustrated in FIGS. 1B, 2B, and 3B to be electromagnetically coupled to the antenna at the plurality of positions.

Example No. 2 includes the features of Example No. 1. Example No. 2 optionally includes, as illustrated in FIGS. 1A, 2A, and 3A, a plurality of loops that are adjacent to one another. In an embodiment, one or more of the DPDT switches are positioned between two of the plurality of adjacent loops.

Example No. 3 includes the features of Example Nos. 1-2. Example No. 3 optionally includes, as illustrated in FIGS. 1A, 2A, and 3A, four adjacent loops in the antenna.

Example No. 4 includes the features of Example Nos. 1-3. Example No. 4 optionally includes, as illustrated in FIGS. 1A, 2A, and 3A, four adjacent loops that are formed by a single wire.

Example No. 5 includes the features of Example Nos. 1-4. Example No. 5 optionally includes, as illustrated in FIGS. 1A, 1B, 2A, 2B, 3A, and 3B, four adjacent loops are substantially positioned in the same plane and form an upper right quadrant (1), an upper left quadrant (2), a lower left quadrant (3), and a lower right quadrant (4). In an embodiment, the loops of the antenna are positioned in the same plane, as this makes a more compact antenna or card reader. However, one or more of the loops could be out of plane by several degrees or more, and the antenna would still function according to this Example No. 5. The degree to which one or more of the loops could be out of plane so that the antenna still functions can easily be determined for any particular situation by a person of skill in the art.

Example No. 6 includes the features of Example Nos. 1-5. Example No. 6 optionally includes, as illustrated in FIGS. 1A, 2A, and 3A, a first DPDT switch 150 that is positioned between the upper left quadrant (2) and the lower left quadrant (3), a second DPDT switch 150 that is positioned between the upper right quadrant (1) and the lower right quadrant (4), and a third DPDT switch 150 that is positioned between the upper right quadrant (1) and the upper left quadrant (2) or the lower right quadrant (4) and the lower left quadrant (3).

Example No. 7 includes the features of Example Nos. 1-6. Example No. 7 optionally includes, as illustrated in FIG. 1A, a first DPDT switch that is configured such that a current flows through a section of the upper left quadrant (2) that is adjacent to a section of the lower left quadrant (3), that a current flows through the section of the lower left quadrant (3) that is adjacent to the section of the upper left quadrant (2), and that the current flow through the section of the upper left quadrant (2) that is adjacent to the section of the lower left quadrant (3) is in a direction opposite to the current flow in the section of the lower left quadrant (3) that is adjacent to the section of the upper left quadrant (2). A second DPDT switch is configured such that a current flows through a section of the upper right quadrant (1) that is adjacent to a section of the lower right quadrant (4), that a current flows through the section of the lower right quadrant (4) that is adjacent to the section of the upper right quadrant (1), and that the current flow in the section of the upper right quadrant (1) that is adjacent to the section of the lower right quadrant (4) is in a direction opposite to the current flow in the section of the lower right quadrant (4) that is adjacent to the section of the upper right quadrant (1). A third DPDT switch is configured such that a current flows through a section of the upper right quadrant (1) that is adjacent to a section of the upper left quadrant (2), that a current flows through the section of the upper left quadrant (2) that is adjacent to the section of the upper right quadrant (1), and that the current in the section of the upper right quadrant (1) that is adjacent to the section of the upper left quadrant (2) flows in a direction opposite to the current flow in the section of the upper left quadrant (2) that is adjacent to the section of the upper right quadrant (1).

Example No. 8 includes the features of Example Nos. 1-7. Example No. 8 optionally includes, as illustrated in FIG. 1A, first and second DPDT switches that are configured such that there is a direct connection between the upper left quadrant (2) and the upper right quadrant (1) and a direct connection between the lower left quadrant (3) and the lower right quadrant (4). A third DPDT switch is configured such that there is a direct connection between the upper right quadrant (1) and the lower right quadrant (4) and a direct connection between the upper left quadrant (2) and the lower left quadrant (3).

Example No. 9 includes the features of Example Nos. 1-8. Example No. 9 optionally includes, as illustrated in FIG. 2A, a first DPDT switch that is configured such that a current flows in a section of the upper left quadrant (2) that is adjacent to a section of the lower left quadrant (3), that a current flows in the section of the lower left quadrant (3) that is adjacent to the section of the upper left quadrant (2), and that the current flow in the section of the upper left quadrant (2) that is adjacent to the section of the lower left quadrant (3) is in a same direction as the current flow in the section of the lower left quadrant (3) that is adjacent to the section of the upper left quadrant (2). A second DPDT switch is configured such that a current flows in a section of the upper right quadrant (1) that is adjacent to a section of the lower right quadrant (4), that a current flows in the section of the lower right quadrant (4) that is adjacent to the section of the upper right quadrant (1), and that the current flow in the section of the upper right quadrant (1) that is adjacent to the section of the lower right quadrant (4) is in a same direction as that of the current flow in the section of the lower right quadrant (4) that is adjacent to the section of the upper right quadrant (1). A third DPDT switch is configured such that a current flows in a section of the upper right quadrant (1) that is adjacent to a section of the upper left quadrant (2), that a current flows in the section of the upper left quadrant (2) that is adjacent to the section of the upper right quadrant (1), and that the current flow in the section of the upper right quadrant (1) that is adjacent to the section of the upper left quadrant (2) travels in a direction opposite that of a current flow in the section of the upper left quadrant (2) that is adjacent to the section of the upper right quadrant (1).

Example No. 10 includes the features of Example Nos. 1-9. Example No. 10 optionally includes, as illustrated in FIG. 2A, first and second DPDT switches that are configured such that there is a direct connection between the upper left quadrant (2) and the upper right quadrant (1) and a direct connection between the lower left quadrant (3) and the lower right quadrant (4). A third DPDT switch is configured such that there is a direct connection between the lower right quadrant (4) and the upper left quadrant (2) and a direct connection between the upper right quadrant (1) and the lower left quadrant (3).

Example No. 11 includes the features of Example Nos. 1-10. Example No. 11 optionally includes, as illustrated in FIG. 3A, a first DPDT switch that is configured such that a current flows from the upper left quadrant (2) directly into the lower left quadrant (3), a second DPDT switch that is configured such that a current flows from the upper right quadrant (1) directly into the lower right quadrant (4), and a third DPDT switch that is configured such that a current flows in a section of the upper right quadrant (1) that is adjacent to a section of the upper left quadrant (2), that a current flows in the section of the upper left quadrant (2) that is adjacent to the section of the upper right quadrant (1), and that the current in the section of the upper right quadrant (1) travels in a same direction to that of the current in the section of the upper left quadrant (2).

Example No. 12 includes the features of Example Nos. 1-11. Example No. 12 optionally includes, as illustrated in FIG. 3A, a first DPDT switch that is configured such that there is a direct connection between the upper left quadrant (2) and the lower left quadrant (3), a second DPDT switch that is configured such that there is a direct connection between the upper right quadrant (1) and the lower right quadrant (4), and a third DPDT switch is configured such that there is a direct connection between the lower right quadrant (4) and the upper left quadrant (2) and a direct connection between the upper right quadrant (1) and the lower left quadrant (3).

Example No. 13 includes the features of Example Nos. 1-12. Example No. 13 optionally includes, as illustrated in FIGS. 1B, 2B, and 3B, a device that is planar.

Example No. 14 includes the features of Example Nos. 1-13. Example No. 14 optionally includes a device that is a smart card.

Example No. 15 includes the features of Example Nos. 1-14. Example No. 15 optionally includes, as illustrated in FIGS. 1A, 2A, and 3A, a microprocessor that is coupled to the DPDT switches.

Example No. 16 includes the features of Example Nos. 1-15. Example No. 16 optionally includes a microprocessor that is configured to alter the configuration of the DPDT switches on a cyclical and/or periodic basis.

Example No. 17 is an antenna that includes a plurality of adjacent loops; and a plurality of double pole double throw (DPDT) switches, each of the plurality of DPDT switches positioned between two of the plurality of adjacent loops; wherein the DPDT switches are configured to cause a change in direction of current in one or more of the plurality of adjacent loops, thereby altering a direction of a magnetic field in one or more of the plurality of adjacent loops, such that a device positioned at a plurality of positions in relation to the antenna is electromagnetically coupled to the antenna at the plurality of positions.

Example No. 18 includes the features of Example No. 17, and optionally includes an antenna wherein the plurality of adjacent loops comprises four adjacent loops; and wherein the four adjacent loops are positioned in the same plane and form an upper right quadrant, an upper left quadrant, a lower right quadrant, and a lower left quadrant.

Example No. 19 includes the features of Example Nos. 17-18, and optionally includes an antenna wherein a first DPDT switch is positioned between the upper left quadrant and the lower left quadrant, a second DPDT switch is positioned between the upper right quadrant and the lower right quadrant, and a third DPDT switch is positioned between the upper right quadrant and the upper left quadrant or the lower right quadrant and the lower left quadrant.

Example No. 20 is an antenna including a plurality of adjacent loops; and a plurality of double pole double throw (DPDT) switches, each of the plurality of DPDT switches positioned between two of the plurality of adjacent loops; wherein the plurality of adjacent loops comprises four adjacent loops; and wherein the four adjacent loops are positioned in the same plane and form an upper right quadrant, an upper left quadrant, a lower right quadrant, and a lower left quadrant; wherein a first DPDT switch is positioned between the upper left quadrant and the lower left quadrant, a second DPDT switch is positioned between the upper right quadrant and the lower right quadrant, and a third DPDT switch is positioned between the upper right quadrant and the upper left quadrant or the lower right quadrant and the lower left quadrant; wherein the DPDT switches are configured to cause a change in direction of current in one or more of the plurality of adjacent loops, thereby altering a direction of a magnetic field in one or more of the plurality of adjacent loops, such that a device positioned at a plurality of positions in relation to the antenna is electromagnetically coupled to the antenna at the plurality of positions.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and essence of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. An antenna comprising:

a plurality of loops; and a plurality of double pole double throw (DPDT) switches, the plurality of DPDT switches coupled to the plurality of loops;

wherein the DPDT switches are configured to cause a change in direction of current in one or more of the plurality of loops, thereby altering a direction of a magnetic field in one or more of the plurality of loops, such that a device positioned at a plurality of positions in relation to the antenna is electromagnetically coupled to the antenna at the plurality of positions;

wherein the plurality of adjacent loops comprises four adjacent loops; and wherein the four adjacent loops are substantially positioned in the same plane and form an upper right quadrant, an upper left quadrant, a lower right quadrant, and a lower left quadrant.

2. The antenna of claim 1, wherein the plurality of loops comprises adjacent loops.

3. The antenna of claim 1, wherein the four adjacent loops are formed by a single wire.

4. The antenna of claim 1, wherein a first DPDT switch is positioned between the upper left quadrant and the lower left quadrant, a second DPDT switch is positioned between the upper right quadrant and the lower right quadrant, and a third DPDT switch is positioned between the upper right quadrant and the upper left quadrant or the lower right quadrant and the lower left quadrant.

5. The antenna of claim 4, wherein the first DPDT switch is configured such that a current flows through a section of the upper left quadrant that is adjacent to a section of the lower left quadrant, that a current flows through the section of the lower left quadrant that is adjacent to the section of the upper left quadrant, and that the current flow through the section of the upper left quadrant that is adjacent to the section of the lower left quadrant is in a direction opposite to the current flow in the section of the lower left quadrant that is adjacent to the section of the upper left quadrant;

wherein the second DPDT switch is configured such that a current flows through a section of the upper right quadrant that is adjacent to a section of the lower right quadrant, that a current flows through the section of the lower right quadrant that is adjacent to the section of the upper right quadrant, and that the current flow in the section of the upper right quadrant that is adjacent to the section of the lower right quadrant is in a direction opposite to the current flow in the section of the lower right quadrant that is adjacent to the section of the upper right quadrant; and wherein the third DPDT switch is configured such that a current flows through a section of the upper right quadrant that is adjacent to a section of the upper left quadrant, that a current flows through the section of the upper left quadrant that is adjacent to the section of the upper right quadrant, and that the current in the section of the upper right quadrant that is adjacent to the section of the upper left quadrant flows in a direction opposite to the current flow in the section of the upper left quadrant that is adjacent to the section of the upper right quadrant.

6. The antenna of claim 4, wherein the first and second DPDT switches are configured such that there is a direct connection between the upper left quadrant and the upper right quadrant and a direct connection between the lower left quadrant and the lower right quadrant; and wherein the third DPDT switch is configured such that there is a direct connection between the upper right quadrant and the lower right quadrant and a direct connection between the upper left quadrant and the lower left quadrant.

7. The antenna of claim 4, wherein the first DPDT switch is configured such that a current flows in a section of the upper left quadrant that is adjacent to a section of the lower left quadrant, that a current flows in the section of the lower left quadrant that is adjacent to the section of the upper left quadrant, and that the current flow in the section of the upper left quadrant that is adjacent to the section of the lower left quadrant is in a same direction as the current flow in the section of the lower left quadrant that is adjacent to the section of the upper left quadrant;

wherein the second DPDT switch is configured such that a current flows in a section of the upper right quadrant that is adjacent to a section of the lower right quadrant, that a current flows in the section of the lower right quadrant that is adjacent to the section of the upper right quadrant, and that the current flow in the section of the upper right quadrant that is adjacent to the section of the lower right quadrant is in a same direction as that of the current flow in the section of the lower right quadrant that is adjacent to the section of the upper right quadrant; and wherein the third DPDT switch is configured such that a current flows in a section of the upper right quadrant that is adjacent to a section of the upper left quadrant, that a current flows in the section of the upper left quadrant that is adjacent to the section of the upper right quadrant, and that the current flow in the section of the upper right quadrant that is adjacent to the section of the upper left quadrant travels in a direction opposite that of a current flow in the section of the upper left quadrant that is adjacent to the section of the upper right quadrant.

8. The antenna of claim 4, wherein the first and second DPDT switches are configured such that there is a direct connection between the upper left quadrant and the upper right quadrant and a direct connection between the lower left quadrant and the lower right quadrant; and the third DPDT switch is configured such that there is a direct connection between the lower right quadrant and the upper left quadrant and a direct connection between the upper right quadrant and the lower left quadrant.

9. The antenna of claim 4, wherein the first DPDT switch is configured such that a current flows from the upper left quadrant directly into the lower left quadrant;

wherein the second DPDT switch is configured such that a current flows from the upper right quadrant directly into the lower right quadrant; and wherein the third DPDT switch is configured such that a current flows in a section of the upper right quadrant that is adjacent to a section of the upper left quadrant, that a current flows in the section of the upper left quadrant that is adjacent to the section of the upper right quadrant, and that the current in the section of the upper right quadrant travels in a same direction to that of the current in the section of the upper left quadrant.

10. The antenna of claim 4, wherein the first DPDT switch is configured such that there is a direct connection between the upper left quadrant and the lower left quadrant;

wherein the second DPDT switch is configured such that there is a direct connection between the upper right quadrant and the lower right quadrant; and wherein the third DPDT switch is configured such that there is a direct connection between the lower right quadrant and the upper left quadrant and a direct connection between the upper right quadrant and the lower left quadrant.

11. The antenna of claim 1, wherein the device is planar.

12. Then antenna of claim 11, wherein the device is a smart card.

13. The antenna of claim 1, comprising a microprocessor coupled to the three DPDT switches.

14. The antenna of claim 13, wherein the microprocessor is configured to alter the configuration of the three DPDT switches on a cyclical and periodic basis.

15. An antenna comprising:

a plurality of adjacent loops; and a plurality of double pole double throw (DPDT) switches, each of the plurality of DPDT switches positioned between two of the plurality of adjacent loops;

wherein the DPDT switches are configured to cause a change in direction of current in one or more of the plurality of adjacent loops, thereby altering a direction of a magnetic field in one or more of the plurality of adjacent loops, such that a device positioned at a plurality of positions in relation to the antenna is electromagnetically coupled to the antenna at the plurality of positions.

16. The antenna of claim 15, wherein the plurality of adjacent loops comprises four adjacent loops; and wherein the four adjacent loops are positioned in the same plane and form an upper right quadrant, an upper left quadrant, a lower right quadrant, and a lower left quadrant.

17. The antenna of claim 16, wherein a first DPDT switch is positioned between the upper left quadrant and the lower left quadrant, a second DPDT switch is positioned between the upper right quadrant and the lower right quadrant, and a third DPDT switch is positioned between the upper right quadrant and the upper left quadrant or the lower right quadrant and the lower left quadrant.

18. An antenna comprising:

a plurality of adjacent loops; and a plurality of double pole double throw (DPDT) switches, each of the plurality of DPDT switches positioned between two of the plurality of adjacent loops;

wherein the plurality of adjacent loops comprises four adjacent loops; and wherein the four adjacent loops are positioned in the same plane and form an upper right quadrant, an upper left quadrant, a lower right quadrant, and a lower left quadrant;

wherein a first DPDT switch is positioned between the upper left quadrant and the lower left quadrant, a second DPDT switch is positioned between the upper right quadrant and the lower right quadrant, and a third DPDT switch is positioned between the upper right quadrant and the upper left quadrant or the lower right quadrant and the lower left quadrant; and wherein the DPDT switches are configured to cause a change in direction of current in one or more of the plurality of adjacent loops, thereby altering a direction of a magnetic field in one or more of the plurality of adjacent loops, such that a device positioned at a plurality of positions in relation to the antenna is electromagnetically coupled to the antenna at the plurality of positions.

* * * * *